US007675386B2

(12) United States Patent
Bumiller

(10) Patent No.: US 7,675,386 B2
(45) Date of Patent: Mar. 9, 2010

(54) INDUCTIVE COUPLING CIRCUIT AND TELECOMMUNICATION METHOD BY SHEATHED CABLES OF AN ELECTRICAL CURRENT DISTRIBUTION NETWORK

(75) Inventor: Gerd Bumiller, Fuerth/Vach (DE)

(73) Assignee: IAD Gesellschaft für Informatik, Automatisierung und Datenverarbeitung mbH, Grosshabersdorf (DE)

( * ) Notice: Subject to any disclaimer, the term of this patent is extended or adjusted under 35 U.S.C. 154(b) by 551 days.

(21) Appl. No.: 10/563,742

(22) PCT Filed: Jul. 11, 2004

(86) PCT No.: PCT/EP2004/007646

§ 371 (c)(1),
(2), (4) Date: Mar. 5, 2007

(87) PCT Pub. No.: WO2005/008913

PCT Pub. Date: Jan. 27, 2005

(65) Prior Publication Data

US 2007/0252658 A1    Nov. 1, 2007

(30) Foreign Application Priority Data

Jul. 11, 2003  (DE) ................ 103 31 744

(51) Int. Cl.
*G05B 11/01* (2006.01)
(52) U.S. Cl. .................... 333/131; 340/310.17
(58) Field of Classification Search ............ 333/119, 333/131; 340/310.11, 310.17, 310.18
See application file for complete search history.

(56) References Cited

U.S. PATENT DOCUMENTS 6,975,210 B2 * 12/2005 Cern .................. 455/41.1

2001/0052843 A1    12/2001 Wiesman

FOREIGN PATENT DOCUMENTS

DE          15 66 60          9/1982

(Continued)

OTHER PUBLICATIONS

Siemens AG, "Geraetehandbuch DCS 3000", Ausgabe A1.0, Feb. 2, 2002, pp. 1.63-1.65.

(Continued)

*Primary Examiner*—Robert Pascal
*Assistant Examiner*—Kimberly E Glenn
(74) *Attorney, Agent, or Firm*—Paul Vincent

(57) ABSTRACT

The various designs of capacitive or inductive coupling/decoupling fitted on cables in a medium voltage network are known, the inductive coupling circuits constantly inducing current in the sheath of the electric cable. The invention aims at obtaining ranges of capacitive coupling/decoupling for an inductive coupling circuit. Therefore, an inductive coupling unit comprising a ring enclosing the sheathed electric cable and a coil, coupled to said ring by induction and connected to a transmission and reception device, is designed such that, upon transmission the current of the message signal is directly induced in the conductor and, upon receptions only the conductor current is evaluated. In a first embodiment, a by-pass, located downstream of the inductive coupling unit and upstream of the defined surface, is connected to the sheath and to ground or to the compensation potential. In a second embodiment, a by-pass connected to the sheath and to the ground or to the compensating potential has a conduction path passing back through the ring core. The invention concerns telecommunication systems in current distribution electrical networks.

12 Claims, 2 Drawing Sheets

FOREIGN PATENT DOCUMENTS

| | | |
|---|---|---|
| DE | 93 15 875 | 2/1994 |
| DE | 197 54 800 | 6/1997 |
| DE | 199 07 095 | 12/2000 |
| EP | 0 684 681 | 11/1995 |
| WO | WO 02/054 605 | 7/2002 |
| WO | WO 02/080 396 | 10/2002 |
| WO | WO 03/036 932 | 5/2003 |

OTHER PUBLICATIONS

Bumiller, G. and Sebeck, M. "Complete Power-Line Narrow Band System for Urban-Wide Communication" in ISPLC 2001, pp. 285-290.

* cited by examiner

INDUCTIVE COUPLING CIRCUIT AND TELECOMMUNICATION METHOD BY SHEATHED CABLES OF AN ELECTRICAL CURRENT DISTRIBUTION NETWORK

This application is the national stage of PCT/EP2004/007646 filed on Jul. 11, 2004 and claims Paris Convention priority of DE 103 31 744.9 filed Jul. 11, 2003

BACKGROUND OF THE INVENTION

The invention primarily concerns an inductive coupling circuit. Furthermore, the invention relates to a telecommunication method in sheathed cables of an electric current distribution network.

The creation of new fast access possibilities to the POTS (plain old telephone system) for telecommunication in the local network area—also called local loop or last mile—is currently the subject of intensive development. After abolishment of the monopoly on telecommunication, wide range, intensive competition has started, which has not yet had major effect in the local network area. The main reason for this is that the former monopolists are still the owners of the distribution networks. Alternatives in form of microwave wireless networks or cable TV networks are currently under development. However, due to their high expense they cannot provide a global alternative to existing telecommunication networks in the foreseeable future. On the other hand, electric energy distribution networks certainly have this potential—as verified by numerous studies and field tests. They have a high coverage and are by far more branched than any existing telecommunications network, for they do not only reach every house, but directly every consumer of electric energy and every socket.

Due to these excellent prospects, a new industrial branch has developed under the term "Power Line Communications (PLC)", as it is called in Europe, or "Broadband over Powerline (BPL)", as it is called in the USA, which aims at the technical realization of the new potentialities and the provision of the related services. Power Line communication systems are information transmission systems, which distribute information over the power cable medium. In this context, the link between transformer station in the low voltage (LV) grid and the installation in the customer site is particularly important. In most cases, the topology of this network section has a point-to-multipoint structure, with the transformer station as the node. A transceiver unit can, for example, be placed at this node which separately feeds high-frequency signals up to 30 MHz to the outgoing cables and superposes them upon the 50 Hz power current. Further transceiver units can be placed at the customer installation at the interface between LV distribution grid of the utility company and the home installation network of the customer system. Here, high-frequency signals are also fed into and received from the energy cable. The superposition of the 50 Hz power current with high-frequency data signal currents generally involves problems of electromagnetic compatibility (EMC).

As can be seen from extensive studies, different EMV measurements can be provided which reduce the interference from conduction-bound and introduced disturbers. For example, the reduction of conduction-bound interference can be realized with decoupling filters where all parasitic conduction-bound propagation paths of the high-frequency signal are suppressed, as far as possible. The decoupling filters are each deployed at the ends of the link at the transformer station and the house connection.

At the transformer station, the filters prevent propagation of the HF signal to the bus bar and to the parallel branches. Thus, on the one hand, the HF emission at the bus bar is reduced as the interference voltage level at the bus bar is attenuated. Moreover, the conduction-bound superposition of HF signals to parallel branches is prevented which allows utilization of the same frequencies on parallel branches.

The decoupling filter is also used at the house connection as a barrier for HF signals. The decoupling filters prevent unwanted intrusion of the HF signal into the home installation network of the customer system and thus effect a separation of energy supply and high-frequency signals. The utility companies usually use a main supply cable with 4-conductor system for the link between transformer station and house connection on the LV distribution grid. That means that the N conductor (return current conductor of the operating circuit) and the PE conductor (protective earth) are combined in one conductor, the PEN conductor. This kind of network type is called TN-C network (Terre-Neutre-Combiné) in contrast to the TN-S network (Terre-Neutre-Separé), where PE- and N-conductor are conducted separately and are only connected together at a single point. Both transformer station and house connection are grounded in the TN-C network. Hence, the return current of a power consumer can travel both over the N-conductor and over the earth.

Clearly, the same also applies for the high-frequency signal of the data transmission. This spatial separation of outgoing conductor and return conductor causes the generation of high magnetic fields that influence adjacent electric circuits by induction and thus induce interference voltages. In the same way, interference voltages from external sources can also superpose the operating voltage and the data signal. Beside the induction by external magnetic fields, a common mode voltage caused by different ground potentials drives a common mode current through the supply line and data lines, respectively. This common mode current causes a decrease in voltage at the impedances of the line and the consumer, and thus represents another interference source.

Single-phase coupling for data transmission by means of a coupling capacitor (galvanic isolation from the power grid and filtering of low-frequency interferences) and a respective discharging resistor is known for example from EP 0 684 681 A1. Together with a HF transformer, this physical network connection effects a galvanic isolation from the power grid, the filtering of low-frequency interferences by a high-pass effect and an adaptation of the network impedance to the input impedance of a subsequent electronic unit with a multi-stage filtering (passive band pass filters) and controlled gain (control circuit with envelope detector, PI controller, proportional element and non-inverting AC amplifier). Furthermore, a diode of the suppressor type can be connected in the coupling module in parallel to the secondary winding of the HF transformer, which suppresses high-voltage spike.

Furthermore, DE 197 54 800 A1 discloses a gateway unit with which the transmit voltage, which is coupled to the network, is independent of the phase angle of the network impedance (and to a large extent also independent of the absolute value of the network impedance), wherein the galvanic insulation and the receiver sensitivity of the gateway unit and the connected devices are not influenced to obtain an improved suppression of interference signals outside the used frequency band of the HF signals. In particular, in the gateway unit for an installation bus system with information transmission by Power Line there is a coupling circuit with an HF transformer, wherein at least a decoupling capacitor and a compensational inductive are connected in series with the primary winding, and this series connection can be connected to a low-voltage grid. The inductive coupler is dimensioned such in a manner that its impedance compensates the impedance of a decoupling capacitor by means of a series resonance for the frequency of a single used HF carrier signal or for the average of frequencies of HF carrier signals, in case several HF carrier signals are used, wherein the inductive coupler is also dimensioned with respect to leakage inductances of the HF transformer. Furthermore, a protection resistor can be added to the series connection of decoupling capacitor, inductor and primary winding. Finally, for the case that a transmit amplifier is connected to the secondary winding of the transformer, which contains an decoupling capacitor or which is connected DC-free over such a capacitor, an additional compensation is performed on the secondary side by means of a secondary side inductor. This inductor on the secondary side is thereby connected in series with the secondary winding of the transformer and compensates the impedance of the decoupling capacitor for the frequency of the HF carrier signal or for the average of the HF carrier signal frequencies. This type of pre-compensation allows the system to work as well and reach a similar coverage in strong inductive grids as in slightly inductive or even capacitive grids.

Furthermore, DE 199 07 095 C1 introduces a coupling circuit for a data transmission unit to one phase of an electric energy distribution grid which comprises a series connection of a coupling capacitor and a first surge protector, which is located between the phase and a reference potential of the electric energy distribution grid, and a drainage coil which is connected in parallel to the first surge protector and to which a data transmission unit can be coupled. In order to specify a coupling circuit and a coupling unit that contains it, which decouples itself in case of an internal error from the medium-voltage grid in such a way that its operation is not affected, a secondary fuse is provided in the series connection of the phase whose electrical parameters are such that it is triggered neither by a current of the data transmission unit nor by excess voltage of the energy distribution grid. The electrical parameters of the secondary fuse and the first surge protector are matched in such a manner that, in case of alloying of the coupling capacitor, the secondary fuse is already triggered by a rising short-circuit current, quickly and safely by the surge protector. The coupling unit comprises an insulating component that encloses the coupling circuit like a housing, particularly in a shape that is comparable to a pin insulator, in such a way that a first connection of the series connection to a phase of the electric energy distribution grid, a second connection of the series connection to the reference potential and a third connection of the drainage coil to a data transmission unit are accessible from outside.

Furthermore, data transmission on power lines both on low-voltage and medium-voltage lines by means of capacitive coupling is known for example from Proceedings of International Symposium on Power Line Communication and its Application 2000. The respective coverage bypasses numerous transformer stations and partly reaches more than 10 km. The disadvantage of this coupling is the direct connection to the conductor, the respective required withstanding voltage, the space required for installation and the necessity of switching the system off for installation. In very compact transformer stations that are supplied from underground cables, mostly new ones, the installation of a capacitive coupling unit is not always possible.

Furthermore, beside capacitive de-/coupling modules inductive de-/coupling modules for the medium-voltage grid are also known, e.g. from the technical manual DCS3000 of the company Siemens AG, release A1.0/02.2002 pages 1-63 to 1-65, which are simply installed over the cable. The inductive coupling unit consists of a two-part ferrite ring core with an assembly clamp, which is put around the energy cable used for data transmission. Coupling to the transceiver station is done by six windings of a conductor that are wrapped around the ferrite ring core. This requires only little space and can be done during operation of the system, whereby the earth serves as the return path for the data signal, for both capacitive as well as inductive coupling. An inductive coupling is based on the principle that a ring-shaped magnetic field is generated by means of this coupling module. A plane is therefore defined within this ring. If a conductor crosses this plane a current is induced into this conductor. If this current cannot flow without restraint, it generates a voltage that again effects a current flow in the opposite direction and compensates for the induced current. For coupling, the effect is used that a current flow in a conductor generates a ring-shaped magnetic field that can be captured and evaluated from the decoupling module. As coupling out and coupling in can be done with the same device, this device would be regarded as a unit and called de-/coupler. Since coupling is effected into the shield and into the conductor and since the shield is grounded on both ends, the current will be induced directly into the shield. The transmission is only possible between two neighbored transformer substations if the shield is not earthed by an earth sleeve or by a lead mantle of an older cable between these transformer substations. For comparison with a transmission system with capacitive couplers this would afford more transmitter/receivers and the time of transit of the message increases considerably. If a transmitter/receiver is defective, the transmission line is interrupted. For some applications, which are critical with regard to real time capability or security requirements, this is not acceptable.

WO 03/036932 discloses a similar inductive coupler with a least one inductive clamp coupler, which clamps the (medium voltage) power cable used for data transmission. As not to disconnect the power cable during assembly, for example a two-part induction coil or an induction coil with a slit and flexible ring core could be used. The inductive coupling and the power supply to a transmitter/receiver with low voltage level could be done by a wireless coupling device, for example by infrared transmission, wherein either an infrared transmitter or an infrared receiver are arranged in the housing (also with two inductive coils). Alternatively, power supply by solar cells and rechargeable batteries are described.

Furthermore, WO 02/054605 discloses an inductive coupler with an RF-transformer, whereas the power cable will be separated and the RF-Transformer loops in at least one of several neutral conductors such that the primary side level lies between neutral conductor and earth potential. The secondary side is connected to a data transmission device, for example, a modem, whereas the other neutral conductors are used for transmission in the reverse direction.

WO 02/080396 discloses a further development of this inductive coupler in the form of a two-part magnetic coil, which clamps the power cable, whereas the secondary winding is wound around the core, and a part of the power cable which passes through the core was used as primary winding. Finally, a capacitive coupler can be arranged at the secondary side of the transformer.

The above discussion of prior art acknowledges inductive coupling units of different design that mostly contain a transformer. An installation during operation of a 10/20 kV power grid is only possible if no contact is necessary in the security area, which is in most cases additionally protected by constructive measures. Hence, a capacitive coupling module as well as the installation of an inductive coupling module directly over a conductor are not possible.

Due to safety reasons, the shields of underground cables between two transformer stations are connected on both ends with earth or a compensational potential. Sometimes, there is a separate cable with its own shield for each phase (three phases), and sometimes, the three phases are combined in a single cable, surrounded by a common shield (as shown in FIG. 1 and FIG. 3). According to the laws of physics, the current takes the path of least resistance. Considering two electric circuits crossing the plane defined by the inductive input coupling, the major part of the current is induced into the electric circuit with the lower resistance.

For the current installation of inductive coupling modules, the electric circuit with the very low resistance is the shield that is grounded on both ends. Thus, the current is induced into the shield. If the shield is grounded between two neighboring transformer stations, as for example in a earth sleeve or the cable has a lead shield isolated with bitumen which has contact to ground water, the electric circuit is closed early and does not reach the neighboring transformer station. Electromagnetic interferences in the surroundings are collected by the shields of the cables and discharged to earth. These compensational currents have an order of magnitude that is absolutely relevant for communication and are captured during decoupling as an interference signal. According to this, an inductive coupling unit is missing in practice which allows a direct induction of the current into the conductor and which prevents capture of the compensational currents on the shield during decoupling. This is especially important because the industry manufacturing medium-voltage or high-voltage systems can be considered as a very progressive industry which quickly picks up improvements and simplifications and puts them into practice.

In contrast to the known inductive coupling devices and methods for information transmission in electric energy distribution networks with shielded energy cables, it is the underlying purpose of the present invention to provide such an inductive coupling device and a method which achieves the coverage provided by capacitive de-/coupler.

SUMMARY OF THE INVENTION

This object is achieved in accordance with the invention by an inductive coupling circuit for information transmission in electric energy distribution grids which is located within the transmission route and which comprises:

an inductive coupling device comprising a ring, which encloses the shielded power cable, and a coil inductively coupled to the ring, which is connected to a transceiver unit, wherein the current of the superposed information signal in the conductor of the power cable flows through the plane defined by the inductive coupling unit, an earth wire subsequently connected to the inductive coupling device, located ahead of the plane and connected to the shield and earth or to a potential compensation, wherein no current results in the shield as there is no other conductive connection from one side of the plane defined for the inductive coupling to the other side other than the connection through the plane itself, wherein, during transmission, the current of the information signal is directly induced into the conductor and, during reception, only the current within the conductor is evaluated.

Furthermore, this object is achieved in accordance with the invention by an inductive coupling circuit for information transmission in electric energy distribution grids which is located within the transmission path and which comprises:

an inductive coupling device comprising a ring, which encloses the shielded power cable, and a coil inductively coupled with the ring which is connected to a transceiver unit, and an earth wire connected to the shield and earth or to a potential compensation, which is lead back through the ring core in such a manner that the current of the superposed information signal in the conductor of the power cable, the return current and/or induced interference signals on the shield as well as the identical return current and/or induced interference signals flow, in opposite directions, through the plane defined by the inductive coupling device, wherein the magnetic field of the two last named currents is compensated and wherein the inductive coupling device induces the current directly into the conductor when transmitting and only evaluates the current in the conductor when receiving.

This object is also achieved by a method for information transmission in electric energy distribution grids with shielded power cables and with an inductive coupling circuit linked to it, wherein the inductive de-/coupling of the information signal through the plane defined by an inductive coupling device of the coupling circuit is performed in such a manner that no current results in the shield and there is no conductive connection from one side of the plane defined for the inductive coupling to the other side, other than the connection through the plane itself, wherein during transmission, the current of the information signal is directly induced into the conductor and, during reception, only the current within the conductor is evaluated.

Finally, this purpose is achieved, based on a method for information transmission in electric energy distribution grids with shielded power cables and with an inductive coupling circuit linked to it by the fact that the inductive de-/coupling of the information signal is performed in such a manner that the current of the superposed information signal in the conductor of the power cable, the return current and/or induced interference signals on the shield as well as the identical return current and/or induced interference signals flow, in opposite directions, through the plane defined by an inductive coupling unit of the coupling circuit, wherein the magnetic field of the two last currents is compensated for and wherein the inductive coupling unit induces the current directly into the conductor when transmitting and only evaluates the current in the conductor when receiving.

For the inductive coupling circuits and the method according to the invention, an installation of the inductive coupling module at the cable is performed via shield and conductor. The shield of an energy line is connected at the end point with ground or a compensational potential available in the transformer station by means of a conductive material, e.g. a metallic fiber ribbon. Thus, the current in the shield flows off to earth over this conductive material, called earth wire (arrester). Hence, the current in the earth wire and in the shield are almost identical (identical at the end of the earth wire/arrester).

In an embodiment of the invention, the earth wire/arrester is lead back through the plane that is defined by the inductive coupling. The ring-shaped magnetic field now induces a current both into the shield and the earth wire. As this current flows through the plane of the ring-shaped magnetic field in the same direction, the current flow is in the opposite direction with respect to the conductor. The opposite currents compensate each other so that nearly no current flow results within the shield. Since now there is no current in the shield, the current is induced into the conductor.

This also applies, if the earth wire has a conductive connection to the shield after crossing the plane for the inductive coupling. In general, it can be said that no current flow results in the shield if there is no other conductive connection from one side of the plane defined for the inductive coupling to the other side other than the connection through the plane itself. Furthermore, this also applies for embodiments of the invention with which the earth wire is located ahead of the plane for the inductive coupling and is lead away from the shield.

The inductive coupling circuits according to the invention have the advantage that by coupling the current into the conductor, the transmission of data is no longer limited to the transmission route between neighboring transformer stations. Since, in most cases, a transformer represents a load of relatively high impedance, most of the current remains in the line that is carried on. Thus, a high number of transformer stations can be bypassed without installing a transceiver unit (for repeater purposes) in these stations.

Beside the cost savings for these transceiver units, the same messages can clearly be transmitted faster within the network as these repetitions are no longer necessary and the system is therefore able to realize critical functions with respect to real-time. Since several transceiver units can now receive the same message, it is possible to construct a redundant communication network where the transmission within the network is guaranteed even if one station or up to a predefined number of stations fail. This requirement is important for safety relevant functions, which are to be performed over such a network.

For decoupling, the current in the conductor which contains the message signal has to be separated from the current in the shield, which contains, due to the shielding effect, a return current and interference signals. The purpose of a shield in a cable is to reduce the electromagnetic field outside the cable. For this purpose, the shield, which is connected at both ends with low impedance, contains a current in the opposite direction so that the resulting magnetic fields outside the cable compensate each other. Inversely, an electromagnetic field of an interference source only induces a current into the shield, whereby in the cable the field caused by the interferer is compensated to a large extent. Thus, the conductor in the cable is not influenced by the interference and is excellently suitable for transmission of data.

Since the inductive coupling module can only be installed both over shield and conductor it only sees the superposition of the wanted signal in the conductor, the return current of the wanted signal in the shield and the induced interferences in the shield. According to the invention, the earth wire of the shield is lead back through the plane that is defined by the inductive coupling. Now, three currents are crossing the plane defined by the inductive coupling. First, the wanted signal in the conductor, second, the return current and the induced interference signals in the shield and third, the identical return current and induced interference signals in the opposite direction. Hereby, the magnetic fields of the last two currents compensate each other and the inductive coupling module only evaluates the current in the conductor.

As already described, no current flow in the shield is evaluated if there is no other conductive connection from one side of the plane defined for the inductive coupling to the other side than the connection through the plane itself. This type of decoupling now allows to exclusively evaluate the current in the conductor of the cable. Since the shield protects the conductor in the cable from induction of interferences, the remaining interference is low. Thus, the resulting ratio of wanted signal and interference signal is very favorable for data transmission. It enables a coverage which is partly superior to that reached by capacitive coupling modules. Assuming a distance between two transformer stations of approximately 450 m, a signal-to-noise ratio of approximately 60 dB can still be attained so that, overall, a transmission over distances of several kilometers and bypassing several transformer stations is still possible.

In a further development of the invention, the inductive coupling device is located in a transformer station and the ring is embodied as a ring-toroidal core or as a plastic ring with wrapped coil.

This further development of the invention is advantageous in that a protective housing is not required for the inductive coupling unit and that it can be installed without an air gap. However, every geometrical shape can, in principle, be chosen which is closed and thus defines a plane (e.g. a square) and it is also possible to use an air coil.

In networks where both overhead cable and underground cables are used the transformer stations are often also connected via underground cable. As the current is induced directly into the conductor, this system can also be used for networks. For short distances between the overhead cable and the transformer station mostly three underground cables, each having a conductor and a shield, are used. Herewith, all inductive coupling units are linked to the same phase in a preferred embodiment of the invention. In a further development of the invention, the inductive coupling unit is linked to all phases.

Embodiments of the invention are advantageous which allow even a mixed installation over one and all three phases with only low losses.

In a further development of the invention, the inductive coupling device is linked to the incoming line of the transformer.

Hereby, the inductive coupling unit according to the invention can also be used for transformer stations where an installation of the inductive coupling module to the incoming and outgoing line is not possible; e.g. overhead cable and open construction in the transformer station.

BRIEF DESCRIPTION OF THE DRAWING

Further advantages and details can be extracted from the following description of preferred embodiments of the invention with reference to the drawing.

DESCRIPTION OF THE PREFERRED EMBODIMENT

Figure 1:
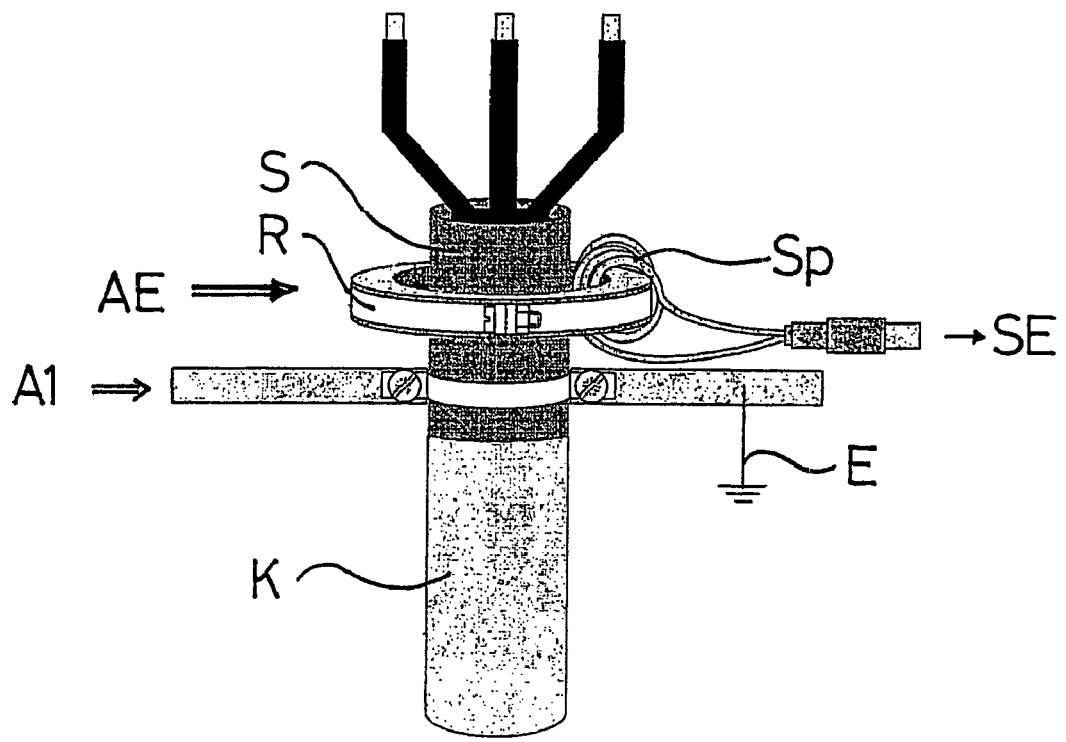
FIG. 1 shows top view of a first embodiment.
Figure 2:
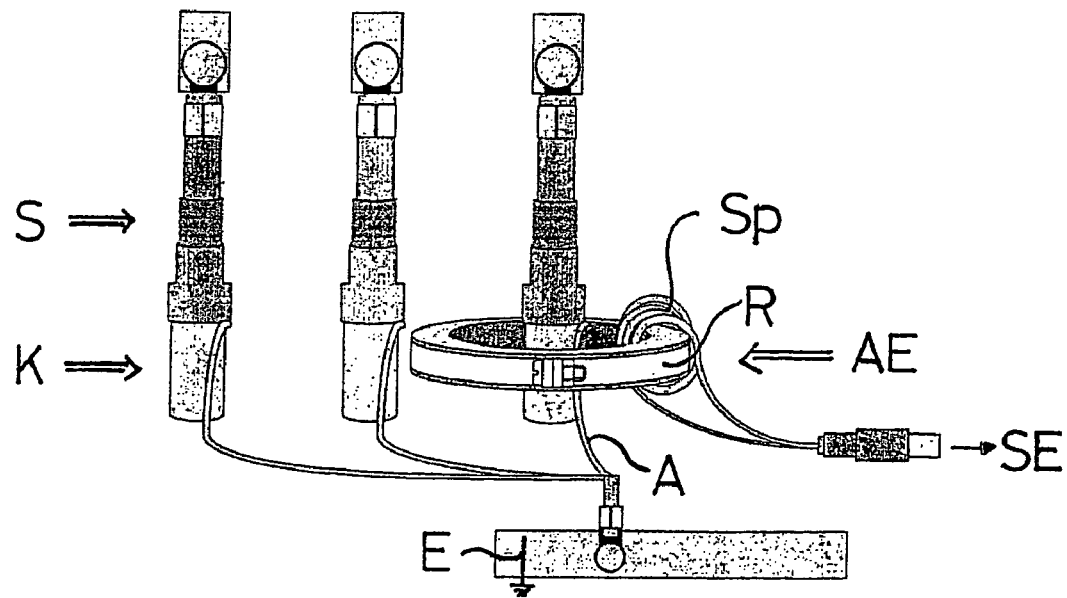
FIG. 2 shows top view of a second embodiment.

The embodiments of the inductive coupling circuit according to the invention shown in FIG. 1 and FIG. 2 are preferably used for information transmission in electric energy distribution networks, particularly in medium-voltage or high-voltage systems. Furthermore, it can be used for almost every cable type and application, for example even for pipelines (here the metal pipe quasi works as the shield and the medium as the conductor) or for energy cables for direct current transmission. Preferably, the inductive coupling circuit consists of an inductive coupling device/unit AE and an arrester/earth wire A1 (see FIG. 1) respectively A (see FIG. 2 and FIG. 3). The inductive coupling unit AE consists of a ring R enclosing the shielded power/energy cable K and a coil SP inductively coupled to the ring which is connected to a transceiver unit SE.

For the embodiment of the inductive coupling circuit according to the invention shown in FIG. 1, the earth wire A1 is subsequently connected in series to the inductive coupling unit AE and located ahead of the plane set up by the inductive coupling as well as connected to the shield S and earth E or to a potential compensation (i.e. the insulated shield S is directly connected to earth E). As a result, no current flow results in the shield, as there is no other connection from one side of the plane defined by the inductive coupling to the other side other than the connection through the plane itself. Hereby, the current is directly induced into the conductor (and not into the shield, as in prior art; see for example technical manual DCS3000 of the company Siemens AG) when transmitting and only the current in the conductor is evaluated when receiving.

Figure 3:
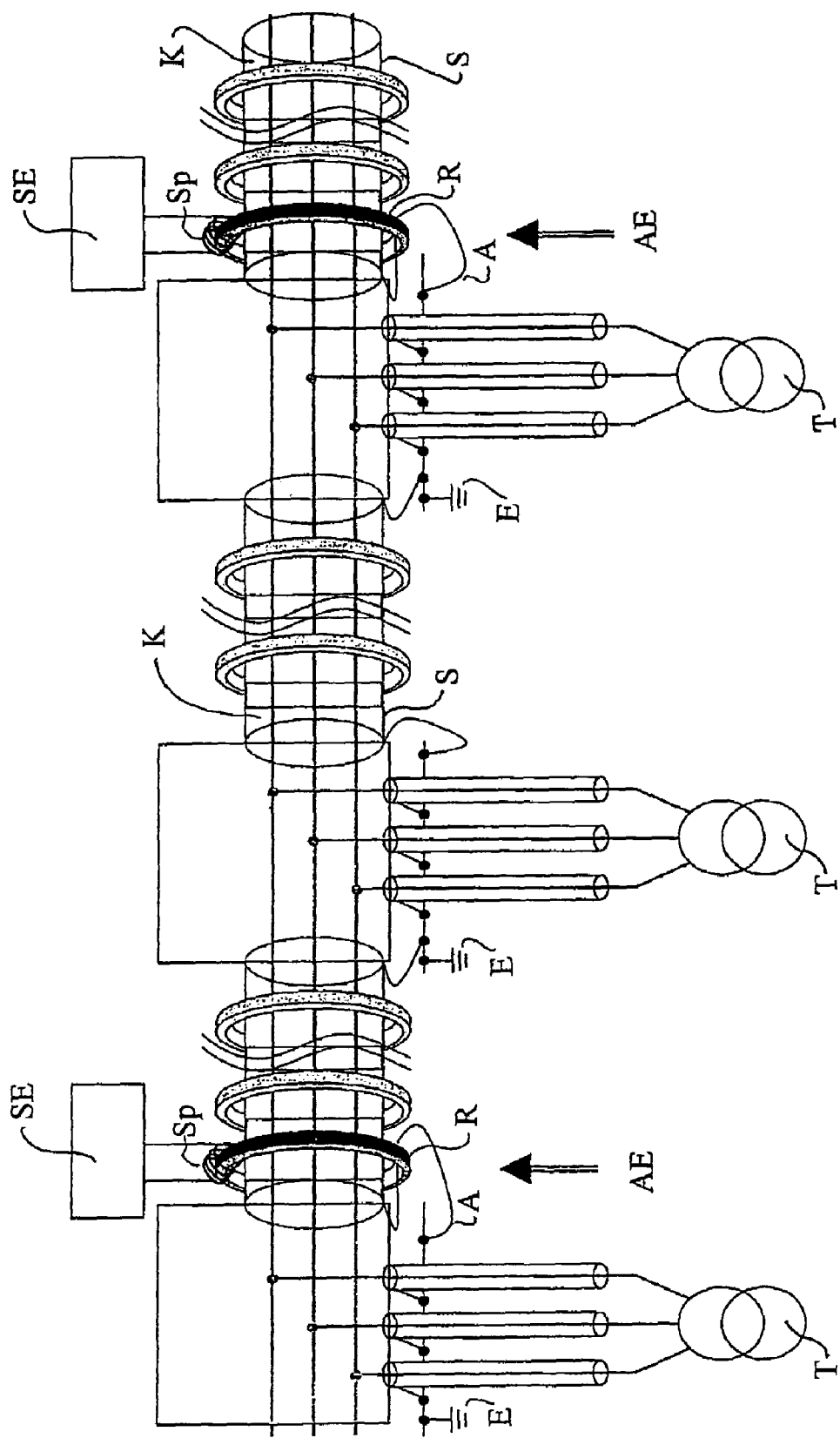
FIG. 3 an arrangement of the inductive coupling circuit for information transmission in electric energy distribution networks according to the invention.

For the embodiment of the inductive coupling circuit according to the invention shown in FIG. 2 and FIG. 3, the line path of the earth wire A connected to shield S and earth E or a compensational potential is lead back through the toroidal core R. Herewith, the plane defined by the inductive coupling unit AE is crossed by:
  the current of the superposed information signal in the conductor of the energy cable K,
  the return current and/or induced interference signals in the shield S
  the identical return current and/or induced interference signals in the opposite direction in the earth wire A.

As a consequence, the magnetic field of the two last named currents is compensated and the inductive coupling unit induces the current directly into the conductor when transmitting and only evaluates the current in the conductor when receiving. Herewith, the earth wire A is preferably lead back as close as possible and parallel to the shield whereby the compensation effect can be increased.

The inductive coupling unit AE is preferably located in a transformer station and the ring R is embodied as a toroidal core or as a plastic ring with a wrapped coil, the inductive coupling unit AE being linked to all phases. For a transmission path with several earth cables, all inductive coupling units AE are linked to the same phase: it is also possible to link the inductive coupling unit AE to the incoming line of the transformer T. The toroidal cores, which are also depicted in FIG. 3 with a light gray color and do not have any references symbols, show the arrangement of an inductive coupling circuit in accordance with prior art (see for example the technical manual DCS3000 of the company Siemens AG) that is required twice per cable section.

The inventive inductive coupling circuit can be used in any application where great demands have to be met with respect to real-time capability and safety and a maximum of efficient and safe transmission of data or a high coverage with a low number of transceiver units shall be obtained, e.g. in mining, in medium-voltage or high-voltage systems or in industrial electronics, particularly in automatic control engineering.

In a further embodiment of the invention, the inductive coupling circuit can be used within the scope of real-time networking of controls (also real-time control with mixed operation over Ethernet or Power Line Communication networks), wherein the ability of the subscribers (e.g. drives, fast I/Os, sensors, actuators, display systems) for synchronization among each other and processing of data in the regulator clock of the drives is a requirement; the inductive coupling circuit can be located in junction boxes; etc.

I claim:

1. An inductive counting circuit for information signal transmission in electric energy distribution grids and disposed within a transmission path, the transmission path having a shielded power cable with a power cable conductor, the circuit comprising:
  an inductive coupling device having a ring that encloses the shielded power cable, and a coil inductively coupled to said ring and connected to a transceiver unit, wherein a current of a superposed information signal in the power cable conductor flows through a plane defined by said inductive coupling device; and
  an earth wire disposed upstream of said plane defined by said inductive coupling, said earth wire connected to the power cable shield and to earth or to a potential compensation, wherein no net current flows in the shield, since there is no conductive connection from one side of said plane to an other side of said plane, other than through said plane itself, and wherein, during transmission, current of an information signal is directly induced into the conductor and, during reception, only current within the conductor is evaluated, wherein all inductive coupling devices are linked to a same phase in a transmission path having several underground cables.

2. The inductive coupling circuit of claim 1, wherein said inductive coupling device is located in a transformer station and said ring is a ring core or a plastic ring with a wrapped coil.

3. An inductive coupling circuit for information transmission in electric energy distribution grids, the grids having a shielded power cable having a power cable conductor, the circuit being located within a transmission path, the circuit comprising:
  an inductive coupling device having a ring which encloses the shielded power cable and a coil inductively coupled to said ring and connected to a transceiver unit; and
  an earth wire connected to the power cable shield and to earth or to a potential compensation, the earth wire being lead back through the ring core, wherein current of a superposed information signal in the power cable conductor, a return current and/or induced interference signals on the shield as well as an identical return current and/or induced interference signals flow through a plane defined by said inductive coupling device in opposite directions, wherein magnetic fields of interfering currents are compensated, said inductive coupling device inducing current directly into the conductor when transmitting and only evaluating current in the conductor when receiving, wherein all inductive coupling devices are linked to a same phase in a transmission path having several underground cables.

4. The inductive coupling circuit of claim 3, wherein said inductive coupling device is located in a transformer station and said ring is a ring core or a plastic ring with a wrapped coil.

5. An inductive coupling circuit for information signal transmission in electric energy distribution grids and disposed within a transmission path the transmission path having a shielded power cable with a flower cable conductor, the circuit comprising:
  an inductive coupling device having a ring that encloses the shielded power cable, and a coil inductively coupled to said ring and connected to a transceiver unit, wherein a current of a superposed information signal in the rower cable conductor flows through a plane defined by said inductive coupling device; and
  an earth wire disposed upstream of said plane defined by said inductive coupling, said earth wire connected to the power cable shield and to earth or to a potential compensation, wherein no net current flows in the shield, since there is no conductive connection from one side of said plane to an other side of said plane, other than through said plane itself, and wherein, during transmission, current of an information signal is directly induced into the conductor and, during reception, only current within the conductor is evaluated, wherein said inductive coupling device is linked to all phases.

6. The inductive coupling circuit of claim 5, wherein said inductive coupling device is located in a transformer station and said ring is a ring core or a plastic ring with a wrapped coil.

7. An inductive coupling circuit for information transmission in electric energy distribution grids, the grids having a shielded power cable having a power cable conductor, the circuit being located within a transmission path, the circuit comprising:
- an inductive coupling device having a ring which encloses the shielded power cable and a coil inductively coupled to said ring and connected to a transceiver unit; and
- an earth wire connected to the power cable shield and to earth or to a potential compensation, the earth wire being lead back through the ring core, wherein current of a superposed information signal in the power cable conductor, a return current and/or induced interference signals on the shield as well as an identical return current and/or induced interference signals flow through a plane defined by said inductive coupling device in opposite directions, wherein magnetic fields of interfering currents are compensated, said inductive coupling device inducing current directly into the conductor when transmitting and only evaluating current in the conductor when receiving, wherein said inductive coupling device is linked to all phases.

8. The inductive coupling circuit of claim 7, wherein said inductive coupling device is located in a transformer station and said ring is a ring core or a plastic ring with a wrapped coil.

9. An inductive coupling circuit for information signal transmission in electric energy distribution grids and disposed within a transmission path, the transmission path having a shielded power cable with a power cable conductor, the circuit comprising:
- an inductive coupling device having a ring that encloses the shielded power cable, and a coil inductively coupled to said ring and connected to a transceiver unit, wherein a current of a superposed information signal in the power cable conductor flows through a plane defined by said inductive coupling device; and
- an earth wire disposed upstream of said plane defined by said inductive coupling, said earth wire connected to the power cable shield and to earth or to a potential compensation, wherein no net current flows in the shield, since there is no conductive connection from one side of said plane to an other side of said plane, other than through said plane itself, and wherein, during transmission, current of an information signal is directly induced into the conductor and, during reception, only current within the conductor is evaluated, wherein said inductive coupling device is linked to an incoming line of an transformer.

10. The inductive coupling circuit of claim 9, wherein said inductive coupling device is located in a transformer station and said ring is a ring core or a plastic ring with a wrapped coil.

11. An inductive coupling circuit for information transmission in electric energy distribution grids, the grids having a shielded power cable having a power cable conductor, the circuit being located within a transmission path, the circuit comprising:
- an inductive coupling device having a ring which encloses the shielded power cable and a coil inductively coupled to said ring and connected to a transceiver unit; and
- an earth wire connected to the power cable shield and to earth or to a potential compensation, the earth wire being lead back through the ring core, wherein current of a superposed information signal in the power cable conductor, a return current and/or induced interference signals on the shield as well as an identical return current and/or induced interference signals flow through a plane defined by said inductive coupling device in opposite directions, wherein magnetic fields of interfering currents are compensated, said inductive coupling device inducing current directly into the conductor when transmitting and only evaluating current in the conductor when receiving, wherein said inductive coupling device is linked to an incoming line of an transformer.

12. The inductive coupling circuit of claim 11, wherein said inductive coupling device is located in a transformer station and said ring is a ring core or a plastic ring with a wrapped coil.

* * * * *